June 12, 1934.  J. W. ASPENLEITER  1,962,800
OPHTHALMIC LENS HOLDER
Filed Dec. 1, 1932

JOSEPH W. ASPENLEITER
INVENTOR

BY *J. A. Ellestad*
ATTORNEY

Patented June 12, 1934

1,962,800

UNITED STATES PATENT OFFICE 1,962,800

OPHTHALMIC LENS HOLDER

Joseph W. Aspenleiter, Rochester, N. Y., assignor to Bausch & Lomb Optical Company, Rochester, N. Y., a corporation of New York Application December 1, 1932, Serial No. 645,142

4 Claims. (Cl. 88—51)

This invention relates to ophthalmic devices and more particularly it has reference to a device which can be used to demonstrate, to a patient, the difference in optical functioning between two pairs of lenses.

In order to enable a patient to determine which of two pairs of lenses affords the clearest vision with maximum comfort, the practitioner holds first one pair and then the other pair of lenses in front of the patient's eyes. This procedure may be followed, for example, when it is desired to demonstrate to the patient the optical advantages of one kind of lens over another.

One of the objects of my invention is to provide an improved device for selectively holding lenses before the eyes of a patient. Another object is to provide such a device with means for adjusting the distance between the lenses of each pair so as to secure the proper interpupillary distance. A further object is to provide a device of the type described which will be relatively simple in structure yet efficient in operation. These and other objects and advantages reside in certain novel features of construction, arrangement and combination of parts as will hereinafter be more fully described and pointed out in the appended claims.

Referring to the drawing.

Figure 1:
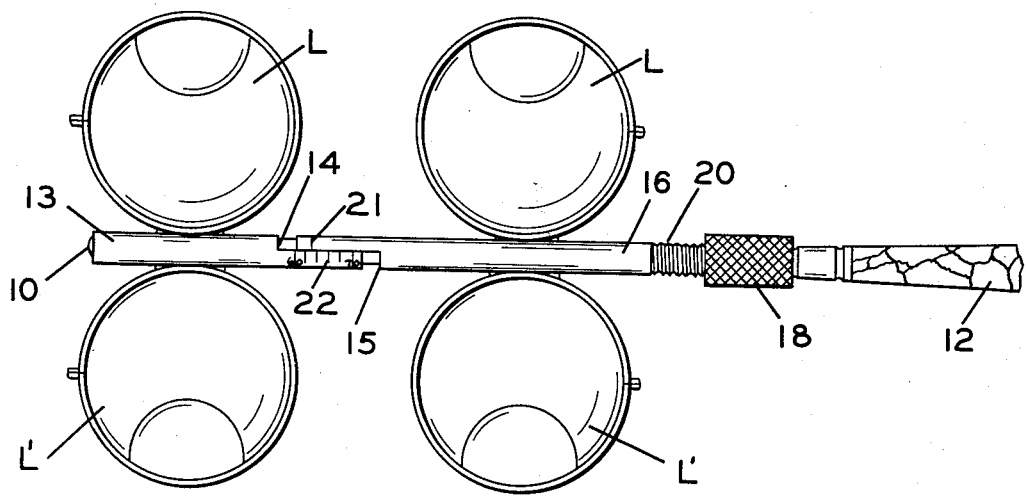
Fig. 1 is a side elevation of my device.
Figure 2:
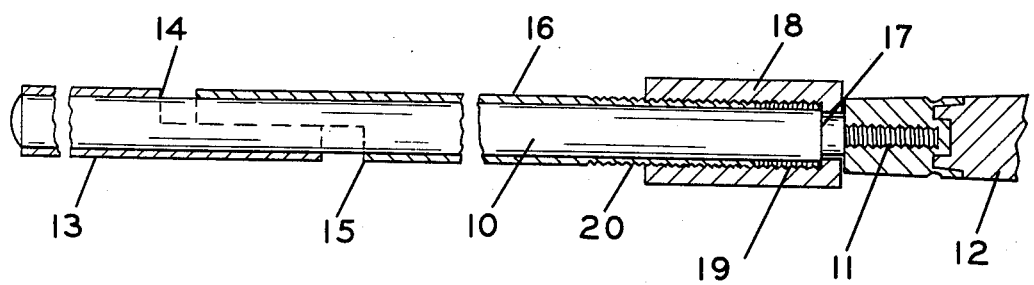
Fig. 2 is a sectional view showing the construction of the support.

A preferred embodiment is shown in the drawing wherein 10 indicates a supporting rod having a reduced threaded portion 11 by means of which it is secured to a suitable handle 12. Fixedly secured, as by soldering, to the free end of rod 10 is a sleeve 13 having a cut-away portion 14 which slidably cooperates with a similar cut-away portion 15 on the end of a second sleeve 16 which is slidably mounted on rod 10. A pair of lenses L is mounted on the top side of the support and a second pair of lenses L' is mounted on the bottom side of the support. In each case, one lens of the pair is mounted on the fixed sleeve 13 and the other lens of the pair is mounted on the movable sleeve 16.

Rotatably mounted on the shoulder 17 of the rod 10 is a bushing 18 which is internally threaded as at 19 to cooperate with the threaded portion 20 on sleeve 16. It will therefore be apparent that rotation of the bushing 18 will cause the sleeve 16 to be moved longitudinally along rod 10 whereby the distances between the lenses of the upper and lower pairs will be varied. An index line 21 on sleeve 16 cooperates with scale means 22 on fixed sleeve 13 to indicate the distance in millimeters, for example, between the centers of the lenses of each pair.

From the foregoing it will be apparent that I am able to attain the objects of my invention and provide an improved device of the character described. The device is efficient in operation yet simple in structure so that it can be cheaply manufactured. Various kinds or types of lenses can, of course, be mounted on the device. Two pairs of bifocal lenses of different structures can be mounted on the rod so that the optical performances of the two kinds of bifocals can be compared. The structure of my device enables the practitioner to readily adjust the distances between the lenses of each pair so as to provide for different interpupillary distances. Various modifications can obviously be made without departing from the spirit of my invention.

I claim:

1. A device of the type described comprising a support, a pair of lenses mounted on the top side of said support, a pair of lenses mounted on the bottom side of said support and means for simultaneously varying the distances between the lenses of each of said two pairs.

2. A device of the type described comprising a rod, a lens mounted on each of the upper and lower sides of said rod, a sleeve slidably mounted on said rod, a lens mounted on each of the upper and lower sides of said sleeve, and means for moving said sleeve to simultaneously and equally vary the distances between the two upper lenses and between the two lower lenses.

3. A device of the character described comprising a rod, two lenses fixedly mounted on said rod, a sleeve slidably mounted on said rod, two lenses fixedly secured to said sleeve, said sleeve having a threaded portion and a threaded bushing rotatably mounted on said rod, said bushing cooperating with the threaded portion on said sleeve whereby the distances between the lenses may be adjusted.

4. A device of the type described comprising a rod, a sleeve fixedly secured to said rod, two lenses fixedly carried by said sleeve, a second sleeve slidably mounted on said rod, two lenses fixedly mounted on said second sleeve, said sleeves having matched cut-away portions carrying cooperating scale means and means for moving said second sleeve to vary the distance between the lenses carried by the two sleeves.

JOSEPH W. ASPENLEITER.